C. J. SCHULTZE.
Apparatus for Mixing Soap and other Materials.
No. 134,706.             Patented Jan. 7, 1873.
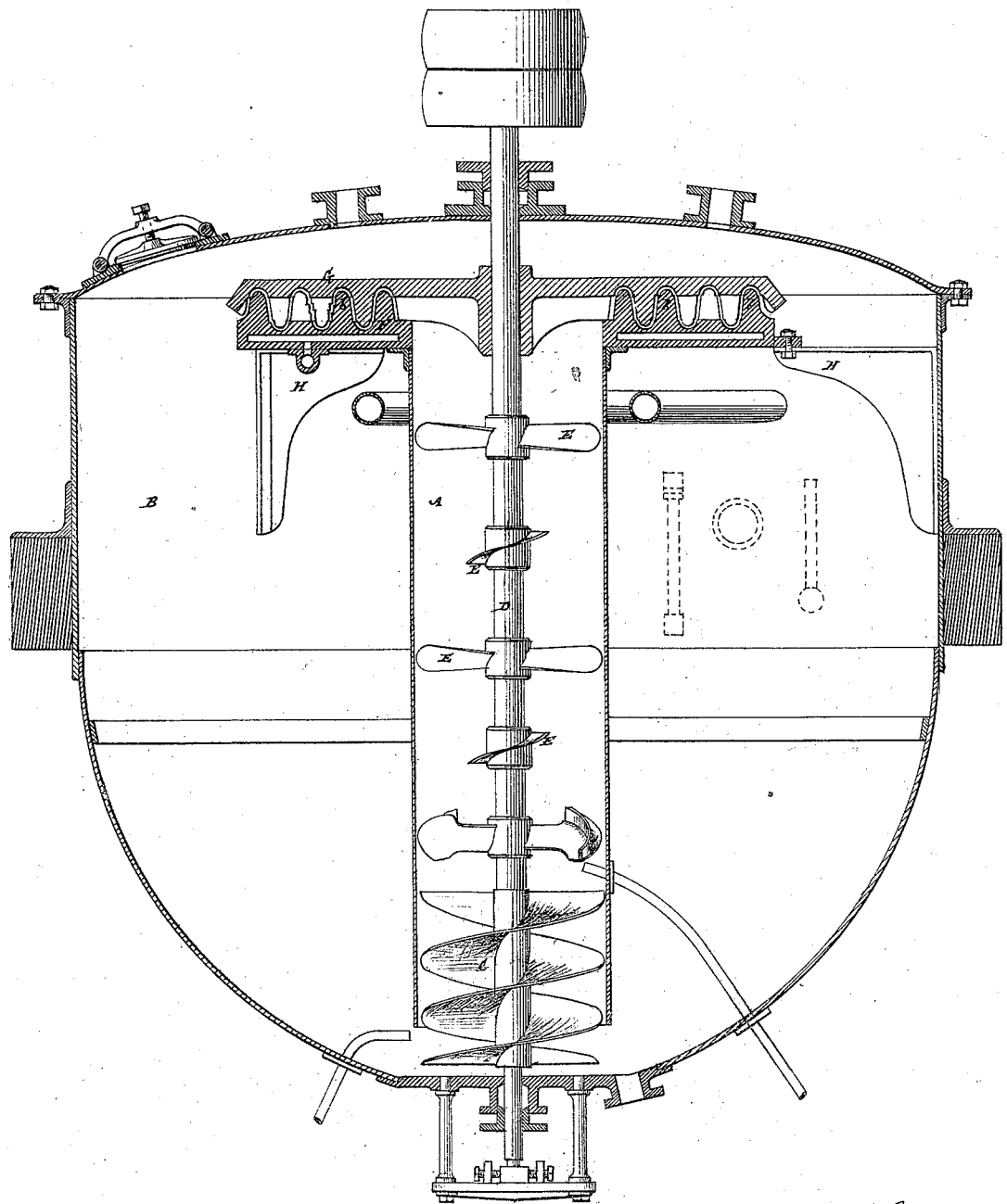

UNITED STATES PATENT OFFICE.

CARL J. SCHULTZE, OF VIENNA, AUSTRIA.

IMPROVEMENT IN APPARATUS FOR MIXING SOAP AND OTHER MATERIALS.

Specification forming part of Letters Patent No. 134,706, dated January 7, 1873.

*To all whom it may concern:*

Be it known that I, CARL JULIUS SCHULTZE, of Vienna, Austria, have invented a new and useful Improvement in Apparatus for Mixing, Circulating, and other purposes; and I do hereby declare that the following is a full, clear, and exact description of the same, reference being had to the accompanying drawing forming part of this specification, and which represents a vertical section of an apparatus constructed in accordance with my improvement.

This invention consists in a novel apparatus by means of which liquid, partially solid, or aeriform materials can be parceled, mixed, and separated, and which is also applicable to evaporating and refrigerating or cooling purposes, and to the acceleration of different chemical processes, the same comprising two cylinders or vessels, the one arranged within the other, and constructed and provided with means, as hereinafter described, to establish circulation and dilaceration of the matter under treatment within and between them.

Referring to the accompanying drawing, A is the inner cylinder, and B the outer cylinder or vessel, both of which are arranged to occupy a vertical position. The outer cylinder B is provided with a cover and bottom, but the inner cylinder A, which is both shorter and narrower, or of less diameter than the outer vessel, is open above and below. Suitable openings above and below are made in the outer vessel to provide for the introduction of the matter to be treated and for its discharge after treatment. The distances of the ends of the interior cylinder from the top and bottom of the outer one is optional and dependent upon circumstances, but there should always be a sufficient space left at such points to allow of the matter to be treated passing up from below through the inner cylinder and discharging itself above into the outer one, in order that a continuous circulation may be kept up. The material to be operated upon is lifted up within the inner cylinder by means of suitable appliances, here shown to consist of a screw, C, fast to the lower portion of a vertical shaft, D, which runs centrally up the inner cylinder, and through the cover of the outer one, and is rotated, by belt or otherwise, at any desired speed, the course of circulation being always up the inner cylinder and down within the outer one. Above the screw C, on the same shaft D, are spiral arms or vanes E, which serve to divide or parcel the lifted mass, and to deliver it within two concentric disks, F G, arranged one above the other at the upper end of the inner cylinder, which they overhang. The one F of these disks is made fast to the inner cylinder, and supported by brackets H from the interior of the outer cylinder, but the other disk G is fast to the shaft D so as to revolve in common with it. Said shaft may be raised or lowered to adjust the distances of the disks F G apart according to the material or amount of matter under treatment. Both disks are formed or provided with annular or other shaped projections *b b* on their contiguous faces, arranged so that the projections of the revolving disk pass between the projections of the stationary one.

Air, steam, or gas may be injected or introduced below the stationary disk to effect evaporation and distillation of the mass, if needed. A similar injection may also be made into the interior of the inner cylinder to control the movement, mixing, heating, or distillation of the mass. Instead, however, of this, and where such direct introduction of steam or its equivalent is objectionable, steam may be introduced within either or both of the disks, made hollow for the purpose. The stationary disk F is shown thus constructed.

In the operation of the apparatus the matter under treatment is lifted by the screw C from the bottom of the outer vessel into and up within the inner cylinder, where it is parceled or divided by the arms E, and forced over the upper end of the inner cylinder between the disks F G, which tear or dilacerate and mix it as required, and which ultimately fling it into the outer cylinder, the mass falling down within the latter, and passing again to the bottom of the inner cylinder, to be again lifted and treated as before. This circulation and operation can be repeated to any extent required.

To circulate or treat materials which do not require to be dilacerated the parceling or dividing devices, and in some cases the screw C, may be omitted, and the circulation and mixing be effected by the injection of air, steam, or gas.

The thin or reduced body of material upon the stationary disk F and the condition of the mass generally causes it to fall or drop in detached particles, thereby allowing of a rapid and complete distillation when heat is applied to the mixture, or a quick and thorough cooling when cold air is introduced within the mass.

I do not claim, broadly, the circulation of the mass by means of an elevating-screw within an interior cylinder or chamber; but What is here claimed, and desired to be secured by Letters Patent, is—

1. The combination of the outer cylinder or vessel B, the inner cylinder A open at its ends to the interior of the outer cylinder, both above and below, with the corrugated stationary disk F and the revolving disk G, substantially as shown and described.

2. The combination of the revolving shaft D, the screw C, the vanes E, and the corrugated disk G with the cylinders or vessels A B and stationary corrugated disk F, the whole being constructed and arranged in relation with each other, essentially as shown and described.

CARL JULIUS SCHULTZE.

Witnesses:
ANTON KATZ,
JOHANN RAUSCHER.